United States Patent [19]

Taka et al.

[11] Patent Number: 5,324,794
[45] Date of Patent: Jun. 28, 1994

[54] POLYESTER FILM

[75] Inventors: Toshio Taka; Yuichiro Yasukawa, both of Kawasaki; Eiichiro Takiyama, Kamakura, all of Japan

[73] Assignee: Showa Highpolymer Co., Ltd., Tokyo, Japan

[21] Appl. No.: 48,226

[22] Filed: Apr. 20, 1993

[30] Foreign Application Priority Data

May 14, 1992 [JP] Japan ................................. 4-148310
May 14, 1992 [JP] Japan ................................. 4-148311
May 14, 1992 [JP] Japan ................................. 4-148312

[51] Int. Cl.$^5$ ............................................. C08F 20/00
[52] U.S. Cl. ................................... 525/440; 528/272; 528/296; 528/300; 528/301; 528/302; 528/307; 525/437
[58] Field of Search ............... 528/272, 296, 300, 301, 528/302, 307; 525/437, 440

[56] References Cited

U.S. PATENT DOCUMENTS

| | | | |
|---|---|---|---|
| 2,999,851 | 9/1961 | Elmer | 528/45 |
| 4,041,208 | 8/1977 | Seeger et al. | 428/424 |
| 4,166,873 | 9/1979 | Gilliam | 428/35 |
| 5,061,778 | 10/1991 | Uchida et al. | 528/45 |
| 5,068,143 | 11/1991 | Agger et al. | 428/241 |

FOREIGN PATENT DOCUMENTS

| | | |
|---|---|---|
| 0323700 | 7/1989 | European Pat. Off. |
| 0393819 | 10/1990 | European Pat. Off. |
| 1059075 | 3/1954 | France |
| 748872 | 5/1956 | United Kingdom |

Primary Examiner—Samuel A. Acquah
Attorney, Agent, or Firm—Sughrue, Mion, Zinn, Macpeak & Seas

[57] ABSTRACT

An aliphatic polyester film which is synthesized from a glycol and an aliphatic polybasic acid having a melt viscosity of 2,000-100,000 poises at a temperature of 190° C. and a shear rate of 100 sec$^{-1}$, and having a melting point of 70°-200° C. The film is excellent in heat stability and mechanical strength as well as biodegradability when buried in the earth; and has low combustion heat than polyethylene and polypyrene.

14 Claims, No Drawings

POLYESTER FILM

BACKGROUND OF THE INVENTION

1. Field of the Invention

The present invention relates to polyester film having excellent heat stability and mechanical strength which are prepared by using aliphatic polyesters having a melt viscosity of 2,000–100,000 poise at a temperature of 190° C. and a shear rate of 100 sec$^{-1}$, and having melting point of 70°–200° C. with biodegradability and sufficiently high molecular weights, such as number-average molecular weight of 20,000. Particularly, the present invention relates to T-die flat film, air-cooling inflation film and water-cooling inflation film, which are formed by the above aliphatic polyesters.

2. Discussion of the Background

Conventionally, it is no exaggeration to say that high molecular weight polyesters (referring to polyesters having number-average molecular weights of at least 10,000) generally used for films, fibers and the like are limited to polyethylene terephthalete, a condensate of terephthalic acid (including dimethyl terephthalate) and ethylene glycol.

However, even though these films, when they are in the form of a simple blown film, have high stiffness and high strength due to the molecular structure of the terephthalic acid, non-oriented films are too brittle to be used as a film, and thus the films have been widely used after being had been oriented. Although oriented polyester film shows excellent transparency and strength, it has inferior heat sealing properties and thus for providing a heat seal packing use film, oriented polyester film has only been used in the form of a laminate with a polyolefin resin or film having high heat sealing capacity.

In order to improve the above mentioned drawbacks, in some examples 2,6-naphthalenedicarboxylic acid has been used instead of terephthalic acid, however, there has not been any example at all in which a polyester using an aliphatic dicarboxylic acid as the dicarboxylic acid has been molded into sheet, film or fiber form for practical use.

One of the reasons why the above mentioned polyester has not been practically used is that even if the aliphatic polyesters have crystallinity, most melting points of the above-mentioned aliphatic polyesters are 100° C. or lower and they also have poor heat stability when they are melted. Of further importance is that the properties, particularly mechanical properties such as tensile strength, of these aliphatic polyesters are of an extremely low level; the polyester having the same level of number-average molecular weight as that of the above-mentioned polyethylene terephthalate shows much poorer properties, thus practical uses have not been found at all for these aliphatic polyesters.

It seems that the studies to possibly improve the physical properties of the aliphatic polyesters by increasing their number-average molecular weights have not made enough progress because of their poor heat stability.

Polyesters such as polyethylene terephthalate having no biodegradability, had a problem of requiring combustion treatment for their complete disposal, as simply disposing of it after use allows it to remain for a long time without being decomposed.

Particularly, in the packaging field, development of a film having high transparency, heat sealability, biodegradability for easy disposal and low combustion heat as well as high strength has eagerly demanded.

The object of the present invention is to provide polyester film, such as T-die flat film, air-cooling inflation film, water-cooling inflation film prepared by using aliphatic polyesters as their components which have sufficient high molecular weights for practical use, and excellent mechanical properties represented by thermal stability and tensile strength, and which can be decomposed by microorganisms and the light, and thus can be easily disposed of which provides only small amounts of combustion heat in disposal treatment after use, and which naturally possess heat sealing properties.

SUMMARY OF THE INVENTION

The present invention achieved the object above-mentioned by providing a polyester film mainly consisting of an aliphatic polyester having a melt viscosity of 2,000–100,000 poise at a temperature of 190° C. and a shear rate of 100sec$^{-1}$, and having melting point of 70° to 200° C.

The present invention achieved the object above-mentioned by providing T-die flat film formed at 120°–240° C. from the aliphatic polyester.

The present invention also achieved the object above-mentioned by providing air cooling inflation film at 120°–240° C. and blow-up ratio of 0.5–6.0 from the aliphatic polyester.

The present invention further achieved the object above-mentioned by providing water-cooling inflation film at 120°–240° C. and blow-up ratio of 1.0–4.0 from the aliphatic polyester.

DETAILED DESCRIPTION OF THE INVENTION

The present invention will be described below in further detail.

The aliphatic polyester of the present invention mainly consists of a polyester obtained by reacting two components of glycols and dicarboxylic acid (or acid anhydrides thereof), and if necessary as a third component, with at least one polyfunctional component selected from the group consisting of trifunctional or tetrafunctional polyols, oxycarboxylic acids, and polybasic carboxylic acids (or acid anhydrides thereof). The aliphatic polyesters are prepared by reacting relatively high molecular weight polyester prepolymers which have hydroxyl groups at ends with a coupling agent so as to make them even higher molecular weight polymer.

It has been known to obtain polyurethane by reacting a low molecular weight polyester prepolymer having a number-average molecular weight of 2,000–2,500, which have hydroxyl groups as the terminal groups, with diisocyanate as a coupling agent in the preparation of rubbers, foams, coatings, and adhesives.

However, the polyester prepolymers used in these polyurethane foams, coatings and adhesives are prepolymers having a low molecular weight and a number-average molecular weight of 2,000–2,500 which is the maximum that can be prepared by non-catalytic reaction. To obtain practical physical properties as the polyurethane, it is necessary that the content of diisocyanate should be as much as 10–20 parts by weight in relation to 100 parts by weight of this low molecular weight prepolymer. When such a large amount of diisocyanate is added to the low molecular weight polyester, gelation occurs so that no normal resins which can be molded in the form of a melt can be ontained.

Also, as shown in the case of polyurethane rubbers, although a method is coceivable in which hydroxyl groups are converted into isocyanate groups by the addition of diisocyanate, and then the number-average molecular weight thereof is further increased by using glycols, the same problem as mentioned above arises because 10 parts by weight of diisocyanate relative to 100 parts by weight of the prepolymer should be used in order to obtain practical physical properties.

When a relative high molecular weight polyester prepolymer is to be used, heavy metal catalysts required to prepare the prepolymer would promote the reactivity of the above-mentioned isocyanate groups to undesirably cause poor preservativity, generation of crosslinking and branching; hence a number-average molecular weight of not more than around 2,500 of polyester prepolymers would be the limit it they were to be prepared without catalysts.

The polyester prepolymers to obtain the aliphatic polyesters used in the present invention are relatively high molecular weight saturated aliphatic polyesters having substantially hydroxyl groups at the ends thereof, number-average molecular weights of at least 5,000, preferably at least 10,000, and melting point of 60° C. or higher, which are obtained by reacting glycols and dibasic acids (or acid anhydrides thereof) in the presence of catalysts.

When a prepolymer having a number-average molecular weight of lower than 5,000 is used, the small amounts of 0.1–5 parts by weight of coupling agents used in the present invention cannot provide polyesters for blow-molding having good physical properties. When polyester prepolymers having number-average molecular weights of 5,000 or higher are used, with hydroxyl values of 30 or less, the use of small amounts of coupling agents even under severe conditions such as a molten state and the like can produce high molecular weight polyesters without gelation as the reaction is not affected by remained catalyst.

Therefore, the polymer for the films of the present invention has a repeated chain structure in which a polyester prepolymer having a number-average molecular weight of 5,000 or more, preferably 10,000 or more and consisting of an aliphatic glycol and aliphatic dicarboxylic acid is combined through the urethane bonds derived from, for example di-isocyanate as a coupling agent.

Further, the polymer for the films of the present invention has a repeated chain structure in which the above-mentioned polyester prepolymer provided branched long chains derived from polyfunctional components is repeatedly combined through the urethane bonds derived from, for example, diisocyanate as a coupling agent. When oxazoline, epoxy compounds, and acid anhydrides are used as a coupling agent, the polyester prepolymer has a repeated chain structure through ester bonds.

Though the film of the present invention is a polyester film, it differs from conventional biaxially oriented polyester film (polyethylene terephthalate resin type film), as it is biodegradable, has heat sealing properties, and provides lower combustion heat compared to polyethylene or polypropylene etc, thus causing less problems regarding its disposal.

Furthermore, although it is an aliphatic polyester resin, the T-die film having received coupling treatment shows high heat stability and good mechanical strength and it can be used for heat sealing packing material as it is.

Examples of glycols which can be used as a reaction component include aliphatic glycols. Among them those having a straight chain alkylene group with even number carbon atoms of 2, 4, 6, 8 and 10 such as: ethylene glycol, 1,4-butanediol, 1,6-hexanediol, 1,8-octanediol, 1,10-decanediol, and mixtures thereof are preferable.

Of these glycols, those having a smaller number of carbon atoms, such as ethylene glycol, 1,4-butanediol and 1,6-hexanediol, are preferable because they can produce an aliphatic polyester having a high crystallinity and a high melting point. In particular, ethylene glycol and 1,4-butanediol are most suitable because they produce good results.

Examples of aliphatic dicarboxylic acids or anhydrides thereof which provide aliphatic polyester by reacting with glycols include aliphatic dicarboxylic acids. Among them those having a straight chain alkylene group with even number carbon atoms of 2, 4, 6, 8 and 10 such as succinic acid, adipic acid, suberic acid, sebacic acid, 1,10-decanedicarboxylic acid, succinic anhydride and mixtures thereof are preferable. Of these dicarboxylic acids, those having a smaller number of carbon atoms, such as succinic acid, adipic acid and succinic anhydride, are preferable because they can produce an aliphatic polyester having high crystallinity and high melting points. In particular, succinic acid, succinic anhydride and an acid mixture of succinic acid or succinic anhydride and another dicarboxylic acid such as adipic acid, suberic acid, sebacic acid or 1,10-decanedicarboxylic acid are preferable.

In the system of an acid mixture containing two or more acid components, for example, succinic acid and other dicarboxylic acids, the mixing ratio of succinic acid is at least 70 mol %, preferably at least 90 mol %, and the mixing ratio of the other carboxylic acids is 30 mol % or less, preferably 10 mol % or less.

A combination of 1,4-butanediol and succinic acid or succinic anhydride and a combination of ethylene glycol and succinic acid or succinic anhydride are particularly preferable for the present invention because the combinations exhibit melting points close to that of polyethylene.

Third Component

To these glycols and dicarboxylic acid, if necessary, may be added as a third component at least one polyfunctional component selected from the group consisting of trifunctional or tetrafunctional polyols, oxycarboxylic acid, and polybasic carboxylic acids (or acid anhydrides thereof). The addition of this third component, which causes the branching of long chains, can impart desirable properties in molten state to the polyester prepolymer, because the ratio of weight-average molecular weight (MW)/number-average molecular weight (Mn), i.e., the molecular weight distribution, increases with increases in its molecular weight.

In terms of the amount of polyfunctional components to be added without fear of gelation, a trifunctional component of 0.1–5 mole %, or a tetrafunctional component of 0.1–3 mole % is added relative to 100 mole % of the total of aliphatic dicarboxylic acid (or acid anhydride thereof) components.

Polyfunctional Components

Examples of polyfunctional components as the third component include trifunctional or tetrafunctional polyols, oxycarboxylic acids, and polybasic-carboxylic acids.

The trifunctional polyols representatively include trimethylol propane, glycerin or anhydrides thereof. The tetrafunctional polyols representatively include pentaerythritol.

The trifunctional oxycarboxylic acid components are divided into the two types of (i) a component which has two carboxyl groups and one hydroxyl group in one molecule, and (ii) another component which has one carboxyl group and two hydroxyl groups in one molecule. Malic acid which has two carboxyl groups and one hydroxyl group in one molecule becomes practical and sufficient to the purposes of the present invention in view of commercial availability at low cost.

The trifunctional oxycarboxylic acid components are the following three types of components:

(i) A component which has three carboxyl groups and one hydroxyl group in one molecule;
(ii) Another component which has two carboxyl groups and two hydroxyl groups in one molecule; and
(iii) The remaining component which has three hydroxyl groups and one carboxyl group in one molecule. Any type can be used, though in view of commercial availability at low cost, citric acid and tartaric acid are practical and sufficient to the purposes of the present invention.

As a trifunctional polybasic carboxylic acid (or acid anhydride thereof) component trimesic acid, propane tricarboxylic acid and the like can be used. Among them, trimesic anhydride is practical for the purposes of the present invention.

As a tetrafunctional polybasic carboxylic acid (or anhydride thereof) various types of aliphatic compounds, cycloaliphatic compounds, aromatic compounds and the like, described in certain literatures, can be used. In view of commercial availability, for example, pyromellitic anhydride, benzophenone tetracarboxylic anhydride and cyclopentane tetracarboxylic anhydride are practical and sufficient to the purposes of the present invention.

These glycols and dibasic acids are mainly consisted of aliphatic series, while small amounts of other components, for example, aromatic series may be concomitantly used. These other components may be blended in amounts up to 20% by weight, preferably up to 10% by weight, and more preferably up to 5% by weight because blending these compounds degrades biodegradability.

The polyester prepolymer for aliphatic polyesters to be used in the present invention has hydroxyl groups at the terminals. To introduce the hydroxyl groups, it is necessary that glycols are used somewhat excessively.

For preparation of the polyester prepolymer having a relatively high molecular weight, it is necessary to use deglycol-reaction catalysts in the deglycol reaction subsequent to the esterification. Examples of the deglycol-reaction catalysts include titanium compounds such as acetoacetoyl type titanium chelate compounds and organic alkoxy titanium compounds and the like. These titanium compounds can be used in combination. Examples of compounds used in combination include diacetoacetoxy oxytitanium (Nippon Chemical Industry Co., Ltd.; Nursem Titanium) tetraethoxy titanium, tetrapropoxy titanium, tetrabutoxy titanium and the like. The amount of the titanium compound used is 0.001–1 part by weight, and preferably 0.01–0.1 part by weight relative to 100 parts by weight of the polyester prepolymer. These titanium compounds may be blended before the esterification, or may be blended immediately before the deglycol-reaction.

As a result, polyester prepolymers having an acid-average molecular weight of at least 5,000, and preferably at least 20,000 and a melting point of 60° C. or higher, can be generally obtained easily. It is even more preferable if these polyester prepolymers have crystallization.

To the polyester prepolymer which has a number-average molecular weight of at least 5,000, preferably at least 10,000, and whose terminal groups are substantially hydroxyl groups are added coupling agents in order to increase its number-average molecular weight.

Examples of the coupling agents include diisocyanate, oxazoline, diepoxy compounds, acid anhydrides and the like. Diisocyanate is particularly preferred.

In cases of oxazoline and diepoxy compounds, it is necessary that the terminal hydroxyl groups are reacted with acid anhydrides and the like to convert them into carboxyl groups, then coupling agents are used.

Although not limited, examples of diisocyanate include 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate, isophorone diisocyanate and the like. Particularly, hexamethylene diisocyanate is preferably used in terms of hue of prepared resins, reactivity at the time of blending polyesters, and the like.

The adding amounts of these coupling agents are 0.1–5 parts by weight, and preferably 0.5–3 parts by weight relative to 100 parts by weight of polyester prepolymer.

Addition of less than 1.0 part by weight causes insufficient coupling reaction, whereas with more than 5 parts by weight gelation tends to occur.

The addition is preferably performed when the polyester is in a uniformly melted state under easily stirrable conditions. Although it is not impossible for the coupling agents to be added to the polyester prepolymer in the solid state and melted and mixed through an extruder, adding the agents in a polyester preparation unit, or adding them to polyester prepolymer in a melt state (for example, in a kneader) is more practical.

The aliphatic polyester resin of the present invention has a melt viscosity of 2,000–100,000 poises at a temperature of 190° C. and at a shear rate of 100 sec$^{-1}$ and MFR (190° C.) of equal to or less than 20 g/10 min. The melt viscosity is preferably 5,000–50,000 poises. When it is smaller than 2,000 poises, both edges undergo considerable waving during T-die molding, and bubble becomes unstable in air-cooling or water-cooling inflation film, thus making the film molding difficult. On the other hand, when it exceeds 100,000 poise, the flow of the resin through the die becomes extremely bad, and the amounts of the resin coming out through the center and the edge of the T-die differs greatly (the amount of resin at the edge is less than that at the center), so the thickness of the film cannot be made uniform for producing a quality film. Also in air-cooling or water-cooling forming resin flow through the die becomes bad and heat generation and surging occurs, thus making the film molding difficult. When MFR is above 20 g/10 min the bubble becomes unstable in air-cooling or water-cooling inflation molding and moldability is lowered.

Other features of the film of the present invention are that the aliphatic polyester has a number-average molecular weight of at least 2,000, a melting point of 70°–200° C., and urethane bonds of 0.3–3.0% by weight. Only when the number-average molecular weight is at least 20,000, can a film having above mentioned strength be obtained, a film that can be used for various applications. When the number-average molecular weight is below 20,000, the film becomes fragile from the view point of its strength, thus it is not advantageous as a film having a practical level of strength.

The film of the present invention can be obtained in a flat film having a film thickness of around 10 μm–150 μm, by an extrusion molding process in which the aliphatic polyester resin is sufficiently melted and mixed in an extruder, and it is extruded through a T-die (a lip gap of 1.2 mm) while the temperature of the resin is kept uniform, then cooled by a chill roll and taken up at the take-up speed of 40–200 m/min.

The air-cooling inflation film and water-cooling inflation film can be obtained in a tubular shape having a film thickness of around 10–150 μm, by an extrusion molding process in which the resin is sufficiently melted and mixed in an extruder, and it is evenly extruded through a circular die while the temperature of the resin is kept uniform, then blown at the blow-up ratio of around 0.5–6.0 (air-cooled blown method), 1.0–4.0 (water-cooled blown method) by a normal inflation method.

Especially important is the setting of the molding temperature. The temperature of the die and the cylinder of the extruder should be 120°–240° C., preferably 140°–190° C. When it is below 120° C., viscosity becomes too high and stabile film formation is prevented. On the other hand, when it is over 240° C., the resin is degraded so that gelation or generation of foreign matter occur often and making it hard to produce a quality film.

The film of the present invention produced by a T-die method shows excellent uniformity of thickness, with the section thickness precision being within ±3%. The physical properties of the film are such that the tensile strength at break (MD) is at least 400 kg/cm$^2$, the tensile elongation at break is at least 200% and the film's modulus of elasticity is at least 600 kg/cm$^2$. The strength at break of at least 150 kg/cm$^2$ is a remarkable feature, since this generally indicates excellent strength as a packaging film, and can even be used for packing heavy articles. A film having a strength at break of below 150 kg/cm$^2$ is not advantageous as a flat film, since it is not strong enough for high speed handling during secondary processing and the like, thus inviting trouble to increase the amount of loss. Another feature of the present film is its tensile elongation at break of at least 200%, so that the film is not broken by projections or various shocks, thus possessing remarkable characteristics for a packing material. Tensile elongation at break of below 200% is not advantageous since the film is easily broken by piercing shock and the like. A feature of the T-die method is to provide a film having a Young's modulus of elasticity of at least 600 kg/cm$^2$. The film formation speed of the T-die method is 100–200 m/min, which is several times quicker than that of the inflation method, and this greatly increases the Young's modulus of elasticity. Accordingly, the film of the present invention is very useful for high speed automated packing or automated bag making. Films having a Young's modulus of elasticity of below 600 kg/cm$^2$ cannot be advantageously used in the secondary processing at high speed.

The physical properties of the film produced by the air-cooling inflation method are such that the tensile strength at break (MD) is at least 300 kg/cm$^2$, the tensile elongation at break is at least 200% and the film's modulus of elasticity is at least 2,000 kg/cm$^2$. The strength at break of at least 300 kg/cm$^2$ is a remarkable feature, since it generally indicates excellent strength as a packing film, such that it can even be used for even packing heavy articles. A strength at break of below 300 kg/cm$^2$ lowers the value of the film due to insufficient strength. Another feature of the present film is its tensile elongation at break of at least 200% as a result of which the film is not broken by projections or various shocks, thus making this a remarkable characteristic for a packing material. Tensile elongation at break of below 200% is not advantageous since the film is easily broken by piercing shock and the like. Furthermore, since it has a Young's modulus of elasticity of at least 2,000 kg/cm$^2$, the film of the present invention shows good processability in case of automated packing or in secondary processing such as bag making; it also shows appropriate stiffness when it is manually handled. That of below 2,000 kg/cm$^2$ is not advantageous from the view point of this secondary processability, ease of handling, etc.

The physical properties of the film produced by the water-cooling inflation method are such that the tensile strength at break (MD) is at least 150 kg/cm$^2$, the tensile elongation at break is at least 400% and the film's modulus of elasticity is at least 1,000 kg/cm$^2$. The strength at break of at least 150 kg/cm$^2$ is a remarkable feature, since it generally indicates excellent strength as a packing film, such that it can even be used for packing heavy articles. A strength at break of below 150 kg/cm$^2$ lowers the value of the film due to insufficient strength. Another feature of the present film is its tensile elongation at break of at least 400% as a result of which product even having the strength at break of around 200 kg/cm$^2$ can be effective and the film is not broken by projections or various shocks, thus making this a remarkable characteristic for a packing material. Tensile elongation at break of below 400%, when the break strength of the film is around 200 kg/cm$^2$, is not advantageous since the film is easily broken by piercing shock and the like. Furthermore, a film having a Young's modulus of elasticity of a 1,000–2,500 kg/cm$^2$ level shows high flexibility and since it also has high transparency, it is advantageously used as a soft material. A film having a Young's modulus of elasticity of more than 2,500 kg/cm$^2$ is highly suitable for automated packing. Those having a Young's modulus of elasticity of below 1,000 kg/cm$^2$ are not advantageous from the view point of easy handling and the like.

Needless to say, when the polyester of the present invention is used, lubricants, waxes, coloring agents and fillers can be used concomitantly, if necessary. In particular during the film formation of the resin of the present invention, in addition to conventional lubricants, a lubricant such as VITON was found especially effective for producing a quality film, specifically for improving the surface smoothness.

The flat film obtained by T-die method shows little thickness irregularity and excellent transparency and luster, and the resin of the present invention has properties very suitable for the processing, and provides a film having excellent mechanical properties with high productivity (high speed molding of more than 100 m/min is possible).

In addition, since the film is made of an aliphatic polyester resin, it shows advantageous properties such as generation of only small amounts of combustion heat, biodegradability and heat sealing properties.

The present invention relates to a film produced by air-cooling inflation molding of an aliphatic polyester resin having a melting point of 70°-200° C., a melt viscosity of 2,000-100,000 poises at a temperature of 190° C. at a shear rate of 100 sec$^{-1}$, and a number average molecular weight of 20,000 or more.

It has been generally impossible to mold aliphatic polyester resins by inflation molding. However, in accordance with the present invention, the inflation molding can be carried out by the use of the above mentioned polyester resin.

With the film of the present invention, the orientation condition in a direction (TD direction) crossing with the film take-up direction (MD direction) can be controlled by changing the blow-up ratio, and the tensile strength at break can also be greatly improved also in the TD direction, to increase the film strength.

As the inflation molding method uses a circular die, a film can be formed from a polymer having a large melt viscosity (high molecular weight), and a film having high environmental stress cracking resistance (ESCR), high impact strength and high modulus of elasticity and the like can be obtained. The obtained film further shows heat sealing properties and since it has a tubular form, it can be easily made into bags.

The present invention relates to a film produced by water-cooling inflation molding of the above aliphatic polyester resin. The water-cooling inflation molding method is effective in improving the transparency since the molten film is directly contacted with water to be solidified (made into a film), however, with a resin having high crystallinity such as polyethylene, the slightest difference in the cooling and the solidifying instances when the resin is contacted with water causes unevenness of cooling of the film to leave creasing or surface waviness of the resulting water-cooling inflation film, thus the method has not been used often.

Fortunately, the polyester resin used in the present invention could be molded by water-cooling inflation method in a very stabilized way, we understand because of the slow crystallization speed of the polyester resin, and a highly transparent film of high quality could be obtained. The produced film was free from any creasing or surface waviness.

As a result of further studies of the conditions in order to obtain a film having high mechanical strength and high transparency, it was found that a resin of high molecular weight needs to be oriented in good balance, and that the water-cooling inflation method carried out at the molding temperature of 120°-240° C., at the blow up ratio of 1.0-4.0 should provide a desired highly transparent film to achieve the present invention.

EXAMPLES

The present invention will be illustrated with reference to the following Examples and Comparative Examples but the invention is not intended to be limited only thereto.

EXAMPLE 1

A 700 L reactor was purged with nitrogen, then 183 kg of 1,4-butanediol and 224 kg of succinic acid were charged in it. After the temperature was elevated under nitrogen stream, esterification by dehydration condensation was carried out for 3.5 hr at 192°-220° C., and after ceasing nitrogen charge, for further 3.5 hr under reduced pressures of 20-2 mmHg. A sample collected had an acid value of 9.2 mg/g, a number-average molecular weight (Mn) of 5,160 and a weight average molecular weight (Mw) of 10,670. Subsequently, 34 g of tetraisopropoxy titanium, a catalyst, was added at normal pressures under nitrogen stream. The temperature was elevated to carry out a deglycol-reaction at temperatures of 215°-220° C. under reduced pressures of 15-0.2 mmHg for 5.5 hr. A sample collected had a number-average molecular weight (Mn) of 16,800 and a weight average molecular weight (Mw) of 43,600. The yield of resulting polyester prepolymer (A1) was 339 kg except condensate water.

5.42 kg of hexamethylene diisocyanate was added to the reactor containing 339 kg of the polyester prepolymer (A1) to perform a coupling reaction for 1 hr at 180°-200° C. The viscosity was rapidly increased, but no gelation occurred. Then, 1.70 kg of Irganox 1010 (Ciba-geigy) as an antioxidant and 1.70 kg of calcium stearate as a lubricant were added, and the mixture was further stirred for 30 min. The resulting reaction product was extruded into water, and cut by a cutter into pellets. The aliphatic polyester (B1) obtained after drying in a vacuum at 90° C. for 6 hr had a yield of 300 kg.

The obtained polyester (B1) was a slightly ivory-like white, waxy crystal, and had a melting point of 110° C., a number-average molecular weight (Mn) of 35,500 a weight-average molecular weight (Mw) of 170,000, a MFR (190° C.) of 1.0 g/10 min, a viscosity of 230 poises in a 10% orthochlorophenol solution and a melt viscosity of $1.5 \times 10^4$ poises at a temperature of 190° C. at a shear rate of 100 sec$^{-1}$. The average molecular weight was measured by Shodex GPC System-11 (Showa Denko, gel permiation chromatography) using a HFIPA solution containing 5 mmol $CF_3COONa$ (concentration of 0.1% by weight) as a medium. A calibration curve was drawn using a PMMA standard sample (Shodex Standard M-75, Showa Denko).

The polyester resin (B1) was extruded through a T-die of 500 mm width (a lip gap of 1.2 mm) using an extruder having a screw diameter of 65 mm$\phi$, L/D=32, at a resin temperature of 190° C. (the cylinder and the die), then cooled under the condition that the chill roll temperature was 20° C., and molded into a flat film having a thickness of 20 μm and a product width of 400 mm, at a take-up speed of 120 m/min. Stabilized formation of the film was done by adjusting the air gap and the air flow rate of the air-knife for controlling the cooling conditions.

The obtained film showed a haze (ASTM D-523, the same shall apply hereinafter) of 4%, a tensile strength at break (JIS Z-1702, the same shall apply hereinafter) of 800 kg/cm$^2$, thus being very strong, a tensile elongation at break (JIS Z-1702, the same shall apply hereinafter) as high as 300%, and a Young's modulus of elasticity (ASTM D-822, the same shall apply hereinafter) of 5,200 kg/cm$^2$, accordingly it had sufficient physical properties as a packing film. The film could be heat melted with a hot plate heat sealer and gave a seal strength of 1200 g/15 mm width at a temperature of 120° C., time of 1 sec, and pressure of 1 kg/cm$^2$.

The film of the present invention was buried in the earth for 2 months, then the strength was measured. The break strength and the elongation were greatly reduced to 320 kg/cm$^2$ and 160% respectively, showed that decomposition of the film took place in the ground.

EXAMPLE 2

The polyester resin (B1) used in Example 1 was extruded through a T-die of 500 mm width (a lip gap of 1.2 mm) using an extruder having a screw diameter of 65 mm$\phi$, L/D=32, at a resin temperature of 170° C. (the cylinder and the die), then cooled under the condition that the chill roll temperature was 20° C. and molded into a flat film having a thickness of 40 $\mu$m and a product width of 400 mm, at a take-up speed of 80 m/min. Stabilized formation of the film was done by adjusting the air gap and the air flow rate of the air-knife for controlling the cooling conditions.

The obtained film showed a haze of 5%, a tensile strength at break of 620 kg/cm$^2$, thus being very strong, a tensile elongation at break as high as 510%, and a Young's modulus of elasticity of 1500 kg/cm$^2$, accordingly it had sufficient physical properties as a packing film. The film could be heat melted with a hot plate heat sealer and gave a seal strength of 1200 g/15 mm width at a temperature of 120° C., time of 1 sec and pressure of 1 kg/cm$^2$.

EXAMPLE 3

A 700 L reactor was purged with nitrogen, then 177 kg of 1,4-butanediol, 198 kg of succinic acid and 25 kg of adipic acid were charged in it. After the temperature was elevated under nitrogen stream, esterification by dehydration condensation was performed for 3.5 hr at 190°-210° C., and after ceasing nitrogen charge, for further 3.5 hr under reduced pressures of 20-2 mmHg. A sample collected had an acid value of 9.6 mg/g, a number-average molecular weight (Mn) of 6,100 and a weight-average molecular weight (Mw) of 12,200. Subsequently, 20 g of tetraisopropoxy titanium, a catalyst, was added at normal pressures under nitrogen stream. The temperature was elevated to perform a deglycol-reaction at temperatures of 210°-220° C. under reduced pressures of 15-0.2 mmHg for 6.5 hr. A sample collected had a number-average molecular weight (Mn) of 17,300 and a weight average molecular weight (Mw) of 46,400. The resulting polyester (A2) had a yield of 337 kg except condensate water.

4.66 kg of hexamethylene diisocyanate was added to the reactor containing 337 kg of the polyester (A2) to perform a coupling reaction for 1 hr at 180°-200° C. The viscosity was rapidly increased, but no gelation occurred. Then, 1.70 kg of Irganox 1010 (Ciba-Geigy) as an antioxidant and 1.70 kg of calcium stearate as a lubricant were added, and the mixture was further stirred for 30 min. The resulting reaction product was extruded into water by an extruder, and cut by a cutter into pellets. The aliphatic polyester (B2) obtained after drying in a vacuum at 90° C. for 6 hr had a yield of 300 kg.

The obtained polyester (B2) was a slightly ivory-like white, waxy crystal, and had a melting point of 103° C., a number-average molecular weight (Mn) of 36,000, a weight-average molecular weight (Mw) of 200,900, a MFR (190° C.) of 0.52 g/10 min, a viscosity of 680 poises in a 10% orthochlorophenol solution and a melt viscosity of 2.2×10$^4$ poises at a temperature of 190° C. at a shear rate of 100 sec$^{-1}$.

The polyester resin (B2) was extruded through a T-die of 500 mm width (a lip gap of 1.2 mm) using an extruder having a screw diameter of 65 mm$\phi$, L/D=32, at a resin temperature of 170° C. (the cylinder and the die), then cooled under the condition that the chill roll temperature was 20° C. and molded into a flat film having a thickness of 20 $\mu$m and a product width of 350 mm, at a take-up speed of 150 m/min. Stabilized formation of the film was done by adjusting the air gap and the air flow rate of the air-knife for controlling the cooling conditions.

The obtained film showed a haze of 3.5%, a tensile strength at break of 840 kg/cm$^2$, thus being very strong, a tensile elongation as high as 280%, and a Young's modulus of elasticity of 5100 kg/cm$^2$, accordingly it had sufficient physical properties as a packing film. The film could be heat melted with a hot plate heat sealer and gave a seal strength of 1500 g/15 mm width at a temperature of 115° C., time of 1 sec and pressure of 1 kg/cm$^2$.

The film of the present invention was buried in the earth for 3 months, then the strength was measured. The break strength and the elongation were greatly reduced to 340 kg/cm$^2$ and 120% respectively, showed that decomposition of the film took place in the ground.

EXAMPLE 4

The polyester resin (B2) used in Example 3 was extruded through a T-die of 500 mm width (a lip gap of 1.2 mm) using an extruder having a screw diameter of 65 mm$\phi$, L/D=32, at a resin temperature of 150° C. (the cylinder and the die), then cooled under the condition that the chill roll temperature was 20° C. and molded into a flat film having a thickness of 30 $\mu$m and a product width of 350 mm, at a take-up speed of 90 m/min. Stabilized formation of the film was done by adjusting the air gap and the air flow rate of the air-knife for controlling the cooling conditions.

The obtained film showed a haze of 5.0%, a tensile break strength of 660 kg/cm$^2$, thus being very strong, a tensile elongation as high as 370%, and a Young's modulus of elasticity of 5200 kg/cm$^2$, accordingly it had sufficient physical properties as a packing film. The film could be heat melted with a hot plate heat sealer and gave a seal strength of 1400 g/15 mm width at a temperature of 120° C., time of 1 sec and pressure of 1 kg/cm$^2$.

EXAMPLE 5

A 700 L reactor was purged with nitrogen, then 145 kg of ethylene glycol, 251 kg of succinic acid and 4.1 kg of citric acid were charged in it. After the temperature was elevated under nitrogen stream, esterification by dehydration condensation was performed for 3.5 hr at 190°-210° C., and after ceasing nitrogen charge, for further 5.5 hr under reduced pressures of 20-2 mmHg. A sample collected had an acid value of 8.8 mg/g, a number-average molecular weight (Mn) of 6,800 and a weight-average molecular weight (Mw) of 13,500. Subsequently, 20 g of tetraisopropoxy titanium, a catalyst, was added at normal pressures under nitrogen stream. The temperature was elevated to perform a deglycol-reaction at temperatures of 210°-220° C. under reduced pressures of 15-0.2 mmHg for 4.5 hr. A sample collected had a number-average molecular weight (Mn) of 33,400 and a weight average molecular weight (Mw) of 137,000. The resulting polyester (A3) had a yield of 323 kg except condensate water, 3.23 kg of hexamethylene diisocyanate was added to the reactor containing 323 kg of polyester (A3) to perform a coupling reaction for 1 hr at 180°-200° C. The viscosity was rapidly increased, but no gelation occurred. Then, 1.62 kg of Irganox 1010 (Ciba-Geigy) as an antioxidant and 1.62 kg of calcium stearate as a lubricant were added, and the mixture was further stirred for 30 min. The resulting reaction product was extruded into water by an extruder, and cut by a cutter into pellets. The polyester (B3) obtained after drying in a vacuum at 90° C. for 6 hr had a yield of 300 kg.

The obtained polyester (B3) was a slightly ivory-like white, waxy crystal, and had a melting point of 96° C., a number-average molecular weight (Mn) of 54,000, a weight-average molecular weight (Mw) of 324,000, a MFR (190° C.) of 1.1 g/10 min, a viscosity of 96 poises in a 10% orthochlorophenol solution and a melt viscosity of $1.6 \times 10^4$ poises at a temperature of 190° C. at a shear rate of 100 sec$^{-1}$.

The polyester resin (B3) was extruded through a T-die of 500 mm width (a lip gap of 2.2 mm) using an extruder having a screw diameter of 65 mm$\phi$, L/D=32, at a resin temperature of 200° C. (the cylinder and the die), then cooled under the condition that the chill roll temperature was 5° C. and molded into a flat film having a thickness of 20 $\mu$m and a product width of 400 mm, at a take-up speed of 120 m/min. Stabilized formation of the film was done by adjusting the air gap and the air flow rate of the air-knife for controlling the cooling conditions.

The obtained film showed a haze of 2.8%, a tensile strength at break of 820 kg/cm$^2$, thus being very strong, a tensile elongation at break as high as 300%, and a Young's modulus of elasticity of 5500 kg/cm$^2$, accordingly it had sufficient physical properties as a packing film. The film could be heat melted with a hot plate heat sealer and gave a seal strength of 1800 g/15 mm width at a temperature of 115° C., time of 1 sec and pressure of 1 kg/cm$^2$.

EXAMPLE 6

A 700 L reactor was purged with nitrogen, then 200 kg of 1,4-butanediol, 250 kg of succinic acid and 2.8 kg of trimethylol propane were charged in it. After the temperature was elevated under nitrogen stream, esterification by dehydration condensation was performed for 4.5 hr at 192°-220° C., and after ceasing nitrogen charge, for further 5.5 hr under reduced pressures of 20-2 mmHg. A sample collected had an acid value of 10.4 mg/g, a number-average molecular weight (Mn) of 4,900 and a weight-average molecular weight (Mw) of 10,000. Subsequently, 37 g of tetraisopropoxy titanium, a catalyst, was added at normal pressures under nitrogen stream. The temperature was elevated to perform a deglycol-reaction at temperatures of 210°-220° C. under reduced pressures of 15-1.0 mmHg for 8 hr. A sample collected had a number-average molecular weight (Mn) of 16,900 and a weight average molecular weight (Mw) of 90,300 (Mw/Mn=5.4). The resulting polyester (A4) had a yield of 367 kg except condensate water of 76 kg.

3.67 kg of hexamethylene diisocyanate was added to the reactor containing 367 kg of polyester (A4) to perform a coupling reaction for 1 hr at 160°-180° C. The viscosity was rapidly increased, but no gelation occurred. Then, 367 kg of Irganox 1010 (Ciba-Geigy) as an antioxidant and 367 kg of calcium stearate as a lubricant were added, and the mixture was further stirred for 30 min. The resulting reaction product was extruded into water by an extruder, and cut by a cutter into pellets. The polyester (B4) obtained after drying in a vacuum at 90° C. for 6 hr had a yield of 350 kg.

The obtained polyester (B4) was a slightly ivory-like white, waxy crystal, and had a melting point of 110° C., a number-average molecular weight (Mn) of 17,900, a weight-average molecular weight (Mw) of 161,500 (Mw/Mn=9.5), a MFR (190° C.) of 0.21 g/10 min and a melt viscosity of $2.0 \times 10^4$ poises at a temperature of 190° C. at a shear rate of 100 sec$^{-1}$. The average molecular weight was measured in the same manner as in Example 1.

The polyester resin (B4) was extruded through a T-die of 500 mm width (a lip gap of 2.2 mm) using an extruder having a screw diameter of 65 mm$\phi$, L/D=32, at a resin temperature of 200° C. (the cylinder and the die), then cooled under the condition that the chill roll temperature was 5° C. and molded into a flat film having a thickness of 50 $\mu$m and a product width of 400 mm, at a take-up speed of 50 m/min. Stabilized formation of the film was done by adjusting the air gap and the air flow rate of the air-knife for controlling the cooling conditions.

The obtained film showed a haze of 4.5%, a tensile strength at break of 900 kg/cm$^2$, thus being very strong, a tensile elongation at break as high as 550%, and a Young's modulus of elasticity of 1200 kg/cm$^2$, accordingly it had sufficient physical properties as a packing film. The film could be heat melted with a hot plate heat sealer and gave a seal strength of 2500 g/15 mm width at a temperature of 115° C., time of 1 sec and pressure of 1 kg/cm$^2$.

The film of the present invention was buried in the earth for 2 months, then the strength was measured. The break strength and the elongation were greatly reduced to 320 kg/cm$^2$ and 180% respectively, showed that decomposition of the film took place in the ground.

EXAMPLE 7

The composition of 50% of the polyester resin (B1) obtained by Example 1 and 50% of the polyester resin (B4) obtained in Example 6 was extruded through a T-die of 500 mm width (a lip gap of 1.2 mm) using an extruder having a screw diameter of 65 mm$\phi$, L/D=32, at a resin temperature of 200° C. (the cylinder and the die), then cooled under the condition that the chill roll temperature was 5° C. and molded into a flat film having a thickness of 20 $\mu$m and a product width of 400 mm, at a take-up speed of 120 m/min. Stabilized formation of the film was done by adjusting the air gap and the air flow rate of the air-knife for controlling the cooling conditions.

The obtained film showed a haze of 2%, a tensile strength at break of 820 kg/cm$^2$, thus being very strong, a tensile elongation at break as high as 400%, and a Young's modulus of elasticity of 800 kg/cm$^2$, accordingly it had sufficient physical properties as a packing film. The film could be heat melted with a hot plate heat sealer and gave a seal strength of 1200 g/15 mm width at a temperature of 120° C., time of 1 sec and pressure of 1 kg/cm$^2$.

The film was buried in the earth for 2 months, then the strength was measured. The break strength and the elongation were greatly reduced to 250 kg/cm$^2$ and 150% respectively, showed that decomposition of the film took place in the ground.

COMPARATIVE EXAMPLE 1

Polyester resin (B1) was extruded through a T-die of 500 mm width (a lip gap of 1.2 mm) using an extruder having a screw diameter of 65 mm$\phi$, L/D=32, at a resin temperature of 250° C. (the cylinder and the die), then cooled under the condition that the chill roll temperature was 20° C. and molded into a flat film having a thickness of 20 $\mu$m and a product width of 200 mm, at a take-up speed of 120 m/min, however, the molten film in the air gap was unstable and it was difficult to form a film having uniform thickness.

COMPARATIVE EXAMPLE 2

Polyester resin (B1) was extruded through a T-die of 500 mm width (a lip gap of 1.2 mm) using an extruder having a screw diameter of 65 mm$\phi$, L/D=32, at a resin temperature of 118° C. (the cylinder and the die), then cooled under the condition that the chill roll temperature was 20° C. and molded into a flat film having a thickness of 20 $\mu$m and a product width of 200 mm, at a take-up speed of 120 m/min, however, the viscosity of the molten resin coming out of the die exit was too high, thus it was not stretched but cut, and a film could not be formed.

EXAMPLE 8

The polyester resin (B1) used in Example 1 was extruded through a spiral die of 50 mm$\phi$ (a lip gap of 1.2 mm) using an extruder having a screw diameter of 40 mm$\phi$, L/D=28, at a resin temperature of 170° C. (the cylinder and the die), then cooled by air from an air ring by a normal air-cooling inflation method and molded into a tubular film having a thickness of 30 $\mu$m and a lay flat width of 200 mm (blow-up ratio of 2.55), at a take-up speed of 20 m/min. Stabilized formation of the film was done by adjusting the air ring and the air flow rate of the blower for controlling the cooling conditions.

The obtained film showed a haze of 12%, a tensile strength at break of 650 kg/cm$^2$, thus being very strong, tensile elongation at break as high as 350%, and a Young's modulus of elasticity of 3300 kg/cm$^2$, accordingly having sufficient physical properties as a packing film. The film could be heat melted with a hot plate heat sealer and gave a seal strength of 800 g/15 mm width at a temperature of 120° C., time of 1 sec, and pressure of 1 kg/cm$^2$.

The film of the present invention was buried in the ground for 2 months, and then the strength was measured. The strength at break and the elongation at break were greatly lowered to 300 kg/cm$^2$ and to 190% respectively, showing that decomposition of the film took place in the ground.

EXAMPLE 9

The polyester resin (B1) used in Example 1 was extruded through a spiral die of 50 mm$\phi$ (a lip gap of 1.2 mm) using an extruder having a screw diameter of 40 mm$\phi$, L/D=28, at a resin temperature of 200° C. (the cylinder and the die), then cooled by air from an air ring by a normal air-cooling inflation method and molded into a tubular film having a thickness of 20 $\mu$m and a lay flat width of 200 mm (blow-up ratio of 2.55), at a take-up speed of 30 m/min. Stabilized formation of the film was done by adjusting the air ring and the air flow rate of the blower for controlling the cooling conditions.

The obtained film showed a haze of 9%, a tensile strength at break of 720 kg/cm$^2$, thus being very strong, tensile elongation at break as high as 320%, and a Young's modulus of elasticity of 4500 kg/cm$^2$, accordingly having sufficient physical properties as a packing film. The film could be heat melted with a hot plate heat sealer and gave a seal strength of 800 g/15 mm width at a temperature of 120° C., time of 1 sec, and pressure of 1 kg/cm$^2$.

EXAMPLE 10

The polyester resin (B2) used in Example 3 was extruded through a spiral die of 50 mm$\phi$ (a lip gap of 1.2 mm) using an extruder having a screw diameter of 40 mm$\phi$, L/D=28, at a resin temperature of 170° C. (the cylinder and the die), then cooled by air from an air ring by a normal air-cooling inflation method and molded into a tubular film having a thickness of 50 $\mu$m and a lay flat width of 160 mm (blow-up ratio of 2.0), at a take-up speed of 20 m/min. Stabilized formation of the film was done by adjusting the air ring and the air flow rate of the blower for controlling the cooling conditions.

The obtained film showed a haze of 10%, a tensile strength at break of 730 kg/cm$^2$, thus being very strong, tensile elongation at break as high as 400%, and a Young's modulus of elasticity of 2800 kg/cm$^2$, accordingly having sufficient physical properties as a packing film. The film could be heat melted with a hot plate heat sealer and gave a seal strength of 1100 g/15 mm width at a temperature of 115° C., time of 1 sec, and pressure of 1 kg/cm$^2$.

The film of the present invention was buried in the ground for 3 months, and then the strength was measured. The strength at break and the elongation at break were greatly lowered to 280 kg/cm$^2$ and to 160% respectively, showing that decomposition of the film took place in the ground.

EXAMPLE 11

The polyester resin (B2) used in Example 3 was extruded through a spiral die of 50 mm$\phi$ (a lip gap of 1.2 mm) using an extruder having a screw diameter of 40 mm$\phi$, L/D=28, at a resin temperature of 150° C. (the cylinder and the die), then cooled by air from an air ring by a normal air-cooling inflation method and molded into a tubular film having a thickness of 100 $\mu$m and a lay flat width of 160 mm (blow-up ratio of 2.0), at a take-up speed of 10 m/min. Stabilized formation of the film was done by adjusting the air ring and the air flow rate of the blower for controlling the cooling conditions.

The obtained film showed a haze of 18%, a tensile strength at break of 700 kg/cm$^2$, thus being very strong, tensile elongation at break as high as 380%, and a Young's modulus of elasticity of 2500 kg/cm$^2$, accordingly having sufficient physical properties as a packing film. The film could be heat melted with a hot plate heat sealer and gave a seal strength of 1100 g/15 mm width at a temperature of 115° C., time of 1 sec, and pressure of 1 kg/cm$^2$.

EXAMPLE 12

The polyester resin (B3) used in Example 5 was extruded through a spiral die of 100 mm$\phi$ (a lip gap of 2.2 mm) using an extruder having a screw diameter of 55 mm$\phi$, L/D=28, at a resin temperature of 170° C. (the cylinder and the die), then cooled by air from an air ring by a normal air-cooling inflation method and molded into a tubular film having a thickness of 30 $\mu$m and a lay flat width of 470 mm (blow-up ratio of 3.0), at a take-up speed of 20 m/min. Stabilized formation of the film was done by adjusting the air ring and the air flow rate of the blower for controlling the cooling conditions.

The obtained film showed a haze of 15%, a tensile strength at break of 800 kg/cm$^2$, thus being very strong, tensile elongation at break as high as 450%, and a Young's modulus of elasticity of 2500 kg/cm$^2$, accordingly having sufficient physical properties as a packing film. The film could be heat melted with a hot plate heat sealer and gave a seal strength of 1500 g/15 mm width at a temperature of 115° C., time of 1 sec, and pressure of 1 kg/cm$^2$.

EXAMPLE 13

The polyester resin (B4) used in Example 6 was extruded through a spiral die of 100 mm$\phi$ (a lip gap of 2.2 mm) using an extruder having a screw diameter of 55 mm$\phi$, L/D=28, at a resin temperature of 180° C. (the cylinder and the die), then cooled by air from an air ring by a normal air-cooling inflation method and molded into a tubular film having a thickness of 30 $\mu$m and a lay flat width of 628 mm (blow-up ratio of 4.0), at a take-up speed of 20 m/min. Stabilized formation of the film was done by adjusting the air ring and the air flow rate of the blower for controlling the cooling conditions.

The obtained film showed a haze of 9%, a tensile strength at break of 900 kg/cm$^2$, thus being very strong, tensile elongation at break as high as 550%, and a Young's modulus of elasticity of 2500 kg/cm$^2$, accordingly having sufficient physical properties as a packing film. The film could be heat melted with a hot plate heat sealer and gave a seal strength of 2000 g/15 mm width at a temperature of 115° C., time of 1 sec, and pressure of 1 kg/cm$^2$.

The film of the present invention was buried in the ground for 2 months, and then the strength was measured. The strength at break and the elongation at break were greatly lowered to 300 kg/cm$^2$ and to 190% respectively, showing that decomposition of the film took place in the ground.

EXAMPLE 14

The composition of 50% of the polyester (B1) obtained by Example 1 and 50% of the polyester (B6) obtained by Example 6 was extruded through a spiral die of 50 mm$\phi$ (a lip gap of 1.2 mm) using an extruder having a screw diameter of 40 mm$\phi$, L/D=28, at a resin temperature of 200° C. (the cylinder and the die), then cooled by air from an air ring by a normal air-cooling inflation method and molded into a tubular film having a thickness of 20 $\mu$m and a lay flat width of 200 mm (blow-up ratio of 2.55), at a take-up speed of 30 m/min. Stabilized formation of the film was done by adjusting the air ring and the air flow rate of the blower for controlling the cooling conditions.

The obtained film showed a haze of 8%, a tensile strength at break of 800 kg/cm$^2$, thus being very strong, tensile elongation at break as high as 400%, and a Young's modulus of elasticity of 4000 kg/cm$^2$, accordingly having sufficient physical properties as a packing film. The film could be heat melted with a hot plate heat sealer and gave a seal strength of 1200 g/15 mm width at a temperature of 120° C., time of 1 sec, and pressure of 1 kg/cm$^2$.

The film of the present invention was buried in the ground for 2 months, and then the strength was measured. The strength at break and the elongation at break were greatly lowered to 300 kg/cm$^2$ and to 190% respectively, showing that decomposition of the film took place in the ground.

COMPARATIVE EXAMPLE 3

Polyester resin (B1) used in Example 1 was extruded through a spiral die of 50 mm$\phi$ (a lip gap of 1.2 mm) using an extruder having a screw diameter of 40 mm$\phi$, L/D=28, at a resin temperature of 250° C. (the cylinder and the die), then cooled by air from an air ring by a normal air-cooling inflation method to try to form a film, however, the bubble was deformed and the frequent gelation caused punctures, thus the film formation could not be obtained.

COMPARATIVE EXAMPLE 4

Polyester resin (B1) used in Example 1 was extruded through a spiral die of 50 mm$\phi$ (a lip gap of 1.2 mm) using an extruder having a screw diameter of 40 mm$\phi$, L/D=28, at a resin temperature of 118° C. (the cylinder and the die), then cooled by air from an air ring by a normal air-cooling inflation method, to try to form a film. However, the viscosity of the melted resin coming out of the die exit was too high, thus it was not blown but cut, and a film could not be formed.

EXAMPLE 15

The polyester resin (B1) used in Example 1 was extruded through a spiral die of 50 mm$\phi$ (a lip gap of 1.2 mm) using an extruder having a screw diameter of 40 mm$\phi$, L/D=28, at a resin temperature of 190° C. (the cylinder and the die), then cooled by water from a water cooling ring (water temperature of 10° C.) a normal water-cooling inflation method and molded into a tubular film having a thickness of 30 $\mu$m and a lay flat width of 200 mm (blow-up ratio of 2.55), at a take-up speed of 20 m/min. Stabilized formation of the film was done by adjusting the water flow rate of the water cooling ring and the distance between the dite and the water cooling ring for controlling the cooling conditions.

The obtained film showed a haze of 4%, a tensile strength at break of 400 kg/cm$^2$, thus being very strong, tensile elongation at break as high as 600%, and a Young's modulus of elasticity of 2000 kg/cm$^2$, accordingly having sufficient physical properties as a packing film. The film could be heat melted with a hot plate heat sealer and gave a seal strength of 1200 g/15 mm width at a temperature of 115° C., time of 1 sec, and pressure of 1 kg/cm$^2$.

The film of the present invention was buried in the ground for 2 months, and then the strength was measured. The strength at break and the elongation at break were greatly lowered to 220 kg/cm$^2$ and to 180% respectively, showing that decomposition of the film took place in the ground.

EXAMPLE 16

The polyester resin (B1) used in Example 1 was extruded through a spiral die of 50 mm$\phi$ (a lip gap of 1.2 mm) using an extruder having a screw diameter of 40 mm$\phi$, L/D=28, at a resin temperature of 210° C. (the cylinder and the die), then cooled by water from a water cooling ring (water temperature of 10° C.) by a normal water-cooling inflation method and molded into a tubular film having a thickness of 20 $\mu$m and a lay flat width of 200 mm (blow-up ratio of 2.55), at a take-up speed of 30 m/min. Stabilized formation of the film was done by adjusting the water flow rate of the water cooling ring and the distance between the dite and the water cooling ring for controlling the cooling conditions.

The obtained film showed a haze of 3%, a tensile strength at break of 480 kg/cm$^2$, thus being very strong, tensile elongation at break as high as 520%, and a Young's modulus of elasticity of 2800 kg/cm$^2$, accordingly having sufficient physical properties as a packing film. The film could be heat melted with a hot plate heat sealer and gave a seal strength of 1200 g/15 mm width at a temperature of 115° C., time of 1 sec, and pressure of 1 kg/cm$^2$.

EXAMPLE 17

The polyester resin (B2) used in Example 3 was extruded through a spiral die of 50 mm$\phi$ (a lip gap of 1.2 mm) using an extruder having a screw diameter of 40 mm$\phi$, L/D=28, at a resin temperature of 170° C. (the cylinder and the die), then cooled by water from a water cooling ring (water temperature of 10° C.) by a normal water-cooling inflation method and molded into a tubular film having a thickness of 50 $\mu$m, and a lay flat width of 160 mm (blow-up ratio of 2.00), at a take-up speed of 20 m/min. Stabilized formation of the film was done by adjusting the water flow rate of the water cooling ring and the distance between the dite and the water cooling ring for controlling the cooling conditions.

The obtained film showed a haze of 4%, a tensile strength at break of 610 kg/cm$^2$, thus being very strong, tensile elongation at break as high as 620%, and a Young's modulus of elasticity of 2200 kg/cm$^2$, accordingly having sufficient physical properties as a packing film. The film could be heat melted with a hot plate heat sealer and gave a seal strength of 1400 g/15 mm width at a temperature of 115° C., time of 1 sec, and pressure of 1 kg/cm$^2$.

The film of the present invention was buried in the ground for 3 months, and then the strength was measured. The strength at break and the elongation at break were greatly lowered to 320 kg/cm$^2$ and to 310% respectively, showing that decomposition of the film took place in the ground.

EXAMPLE 18

The polyester resin (B2) used in Example 3 was extruded through a spiral die of 50 mm$\phi$ (a lip gap of 1.2 mm) using an extruder having a screw diameter of 40 mm$\phi$, L/D=28, at a resin temperature of 150° C. (the cylinder and the die), then cooled by water from a water cooling ring (water temperature of 10° C.) by a normal water-cooling inflation method and molded into a tubular film having a thickness of 100 $\mu$m and a lay flat width of 160 mm (blow-up ratio of 2.0), at a take-up speed of 10 m/min. Stabilized formation of the film was done by adjusting the water flow rate of the water cooling ring and a distance between the dite and the water cooling ring for controlling the cooling conditions.

The obtained film showed a haze of 7.5%, a tensile strength at break of 580 kg/cm$^2$, thus being very strong, tensile elongation at break as high as 600%, and a Young's modulus of elasticity of 2500 kg/cm$^2$, accordingly having sufficient physical properties as a packing film. The film could be heat melted with a hot plate heat sealer and gave a seal strength of 1400 g/15 mm width at a temperature of 115° C., time of 1 sec, and pressure of 1 kg/cm$^2$.

EXAMPLE 19

The polyester resin (B3) used in Example 5 was extruded through a spiral die of 100 mm$\phi$ (a lip gap of 2.2 mm) using an extruder having a screw diameter of 55 mm$\phi$, L/D=28, at a resin temperature of 180° C. (the cylinder and the die), then cooled by water from a water cooling ring (water temperature of 10° C.) by a normal water-cooling inflation method and molded into a tubular film having a thickness of 30 $\mu$m, and a lay flat width of 470 mm (blow-up ratio of 3.0), at a take-up speed of 20 m/min. Stabilized formation of the film was done by adjusting the water flow rate of the water cooling ring and the distance between the dite and the water cooling ring for controlling the cooling conditions.

The obtained film showed a haze of 3%, a tensile strength at break of 670 kg/cm$^2$, thus being very strong, tensile elongation at break as high as 620%, and a Young's modulus of elasticity of 1800 kg/cm$^2$, accordingly having sufficient physical properties as a packing film. The film could be heat melted with a hot plate heat sealer and gave a seal strength of 1800 g/15 mm width at a temperature of 115° C., time of 1 sec, and pressure of 1 kg/cm$^2$.

EXAMPLE 20

The polyester resin (B4) used in Example 6 was extruded through a spiral die of 100 mm$\phi$ (a lip gap of 1.2 mm) using an extruder having a screw diameter of 55 mm$\phi$, L/D=28, at a resin temperature of 190° C. (the cylinder and the die), then cooled by water from a water cooling ring (water temperature of 10° C.) a normal water-cooling inflation method and molded into a tubular film having a thickness of 30 $\mu$m, and a lay flat width of 470 mm (blow-up ratio of 3.0), at a take-up speed of 20 m/min. Stabilized formation of the film was done by adjusting the water flow rate of the water cooling ring and the distance between the dite and the water cooling ring for controlling the cooling conditions.

The obtained film showed a haze of 2.5%, a tensile strength at break of 800 kg/cm$^2$, thus being very strong, tensile elongation at break as high as 550%, and a Young's modulus of elasticity of 1500 kg/cm$^2$, accordingly having sufficient physical properties as a packing film. The film could be heat melted with a hot plate heat sealer and gave a seal strength of 2000 g/15 mm width at a temperature of 115° C., time of 1 sec, and pressure of 1 kg/cm$^2$.

The film of the present invention was buried in the ground for 2 months, and then the strength was measured. The strength at break and the elongation awere greatly lowered to 200 kg/cm$^2$ and to 150% respectively, showing that decomposition of the film took place in the ground.

EXAMPLE 21

The composition of 50% of the polyester (B1) obtained by Example 1 and 50% of the polyester (B4) obtained by Example 6 was extruded through a spiral die of 50 mm$\phi$ (a lip gap of 1.2 mm) using an extruder having a screw diameter of 40 mm$\phi$, L/D=28, at a resin temperature of 200° C. (the cylinder and the die), then cooled by water from a water cooling ring (water temperature of 10° C.) by a normal water-cooling inflation method and molded into a tubular film having a thickness of 20 $\mu$m, and a lay flat width of 200 mm (blow-up ratio of 2.55), at a take-up speed of 30 m/min. Stabilized formation of the film was done by adjusting the water flow rate of the water cooling ring and a distance between the dite and the water cooling ring for controlling the cooling conditions.

The obtained film showed a haze of 2%, a tensile strength at break of 700 kg/cm$^2$, thus being very strong, tensile elongation at break as high as 400%, and a Young's modulus of elasticity of 2000 kg/cm$^2$, accordingly having sufficient physical properties as a packing film. The film could be heat melted with a hot plate heat sealer and gave a seal strength of 1200 g/15 mm width at a temperature of 115° C., time of 1 sec, and pressure of 1 kg/cm$^2$.

The film of the present invention was buried in the ground for 2 months, and then the strength was measured. The strength at break and the elongation at break were greatly lowered to 220 kg/cm$^2$ and to 150% respectively, showing that decomposition of the film took place in the ground.

COMPARATIVE EXAMPLE 5

The polyester resin (B1) used in Example 1 was extruded through a spiral die of 50 mm$\phi$ (a lip gap of 1.2 mm) using an extruder having a screw diameter of 40 mm$\phi$, L/D=28, at a resin temperature of 250° C. (the cylinder and the die), then cooled by water from a water cooling ring (water temperature of 10° C.) by a normal water-cooling inflation method to try to form a film, however, the bubble was deformed and the frequent gelation caused punctures, thus film formation could not be attained.

COMPARATIVE EXAMPLE 6

The polyester resin (B1) used in Example 1 was extruded through a spiral die of 50 mm$\phi$ (a lip gap of 1.2 mm) using an extruder having a screw diameter of 40 mm$\phi$, L/D=28, at a resin temperature of 115° C. (the cylinder and the die), then cooled by water from a water cooling ring (water temperature of 10° C.) by a normal water-cooling inflation method to try to form a film, however, the viscosity of the melted resin coming out of the die exit was too large, thus it was not blown but cut, and a film could not be formed.

What is claimed is:

1. Polyester film comprising an aliphatic polyester which is synthesized from a glycol and an aliphatic polybasic acid or its anhydride having a melt viscosity of 2,000–100,000 poises at a temperature of 190° C. and a shear rate of 100 sec,$^{-1}$, and having a melting point of 70°–200° C.,
   wherein said aliphatic polyester is obtained by adding from 0.1 to 5 parts by weight of diisocyanate to 100 parts by weight of a prepolymer in a molten state, wherein said prepolymer
   is obtained from a reaction of at least an aliphatic glycol and an aliphatic dicarboxylic acid, wherein the reaction includes (a) succinic acid, or its anhydride, reacted with 1,4-butanediol, (b) succinic acid, adipic acid, or their anhydrides, reacted with 1,4-butanediol, or (c) succinic acid, or its anhydride, reacted with ethylene glycol, and
   has a number-average molecular weight of at least 10,000.

2. The polyester film as claimed in claim 1 wherein the film is a T-die flat film formed at a temperature of 120°–240° C. from the aliphatic polyester.

3. The polyester film as claimed in claim 2 wherein the film has a tensile strength at break (MD) of 150 kg/cm$^2$, elongation at break of 200% or more and Young's modulus of elasticity of 600 kg/cm$^2$ or more.

4. The polyester film as claimed in claim 1 wherein the film is air-cooling inflation film formed at a temperature of 120°–240° C. and blow-up ratio of 0.5–6.0 from the aliphatic polyester.

5. The polyester film as claimed in claim 4 wherein the film has a tensile strength at break (MD) of 300 kg/cm$^2$, elongation at break of 200% or more and Young's modulus of elasticity of 2,000 kg/cm$^2$ or more.

6. The polyester film as claimed in claim 1 wherein the film is water-cooling inflation film formed at temperature of 120°–240° C. and blow-up ratio of 1.0–4.0 from the aliphatic polyester.

7. The polyester film as claimed in claim 6 wherein the film has a haze of 8% or less, tensile strength at break of 150 kg/cm$^2$ or more, elongation at break of 400% or more and Young's modulus of elasticity of 600 kg/cm$^2$ or more.

8. The polyester film as claimed in any one of claims 1 to 7 wherein the number-average molecular weight of the aliphatic polyester is 20,000 or more and MFR (190° C.) is equal to or less than 20 g/10 min.

9. The polyester film as claimed in any one of claims 1 to 7 consisting of an aliphatic polyester obtained by reacting 0.1–5 parts by weight of diisocyanate with 100 parts by weight of an aliphatic polyester prepolymer having a number-average molecular weight of at least 10,000 and a melting point of at least 60° C.

10. The polyester film as claimed in any one of claims 1 to 7 wherein the aliphatic polyester has a repeated chain structure in which a polyester prepolymer, which has a number-average molecular weight (Mn) of 10,000 or more and consists of an aliphatic glycol and aliphatic dicarboxylic acid, is combined through the urethane bonds.

11. The polyester film as claimed in any one of claims 1 to 7 wherein the aliphatic polyester has a repeated chain structure in which a polyester prepolymer having a number-average molecular weight (Mn) of 10,000 or more and obtained by reacting the aliphatic glycol, the aliphatic dicarboxylic acid and, as a third component, at least one polyfunctional component selected from the group consisting of trifunctional or tetrafunctional polyols, oxycarboxylic acids and polybasic carboxylic acids or acid anhydrides thereof, is combined through urethane bond.

12. The polyester film as claimed in claim 11 wherein the polyester prepolymer contains one or more compounds selected from the group consisting of trimethylol propane, glycerin and pentaerythritol as the trifunctional or tetrafunctional polyol of the third component.

13. The polyester film as claimed in claim 11 wherein the polyester prepolymer contains one or more compounds selected from the group consisting of malic acid, citric acid and tartaric acid as the trifunctional or tetrafunctional oxycarboxylic acid of the third component.

14. The polyester film as claimed in claim 11 wherein the polyester prepolymer contains one or more compounds selected from the group consisting of trimesic acid, propane tricarboxylic acid, trimellitic anhydride, pyromellitic anhydride, benzophenone tetracarboxylic anhydride and cyclopentane tetracarboxylic anhydride as the trifunctional or tetrafunctional polybasic carboxylic acid of the third component.

* * * * *